US011186488B2

(12) United States Patent
Hongo (10) Patent No.: US 11,186,488 B2
(45) Date of Patent: Nov. 30, 2021

(54) SEPARATION AND RECOVERY METHOD

(71) Applicant: ZEON CORPORATION, Tokyo (JP)

(72) Inventor: Takayoshi Hongo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/981,280

(22) PCT Filed: Mar. 25, 2019

(86) PCT No.: PCT/JP2019/012504
§ 371 (c)(1),
(2) Date: Sep. 16, 2020

(87) PCT Pub. No.: WO2019/188979
PCT Pub. Date: Oct. 3, 2019

(65) Prior Publication Data
US 2021/0039952 A1 Feb. 11, 2021

(30) Foreign Application Priority Data
Mar. 30, 2018 (JP) .............................. JP2018-069983

(51) Int. Cl.
*C01B 32/17* (2017.01)
*C01B 32/172* (2017.01)
*B07B 7/083* (2006.01)

(52) U.S. Cl.
CPC .............. *C01B 32/17* (2017.08); *B07B 7/083* (2013.01); *C01B 32/172* (2017.08)

(58) Field of Classification Search
CPC ....... C01B 32/17; C01B 32/172; C01B 32/16; C01B 32/158; C01B 32/159;
(Continued)

(56) References Cited

U.S. PATENT DOCUMENTS 4,560,471 A * 12/1985 Yamada .................. B07B 7/083
209/135
5,931,305 A * 8/1999 Akiyama ................ B07B 7/083
209/139.2
(Continued)

FOREIGN PATENT DOCUMENTS

WO 2012057229 A1 5/2012
WO 2017145604 A1 8/2017

OTHER PUBLICATIONS

Oct. 6, 2020, International Preliminary Report on Patentability issued in the International Patent Application No. PCT/JP2019/012504.

*Primary Examiner* — Daniel C. McCracken
(74) *Attorney, Agent, or Firm* — Kenja IP Law PC (57) ABSTRACT

The disclosed method includes a separation step wherein composite particles are transferred to a vicinity of an inlet of a fibrous carbon nanostructure path configured to recover fibrous carbon nanostructures by allowing the fibrous carbon nanostructures to pass therethrough, and a fluid flowing toward the inlet of the path and an external force including a component of a direction opposite to the direction in which the fluid flows are applied to the composite particles to separate the fibrous carbon nanostructures and a particulate ceramic support substrate; and a recovery step wherein the separated fibrous carbon nanostructures are transferred to an interior of the path for recovery by a flow of the fluid, with the separated substrate transferred away from the fibrous carbon nanostructure path for recovery, wherein, in the separation step, the external force applied to the substrate is greater than that applied to the fibrous carbon nanostructures.

6 Claims, 5 Drawing Sheets

(58) Field of Classification Search
CPC ... C01B 32/162; C01B 32/164; C01B 32/166; C01B 32/168; C01B 32/174; C01B 32/176; C01B 32/178; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01B 2202/00; C01B 2202/02; B07B 7/083; B07B 7/06; C04B 41/61; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| | | | |
|---|---|---|---|
| 2006/0063091 A1* | 3/2006 | Makino | B07B 9/02 430/110.4 |
| 2009/0065403 A1* | 3/2009 | Ito | B07B 7/083 209/139.2 |
| 2010/0072115 A1* | 3/2010 | Makino | B07B 9/02 209/644 |
| 2013/0287674 A1 | 10/2013 | Eisuke et al. | |
| 2017/0136498 A1* | 5/2017 | Inoki | B07B 7/083 |
| 2019/0055128 A1 | 2/2019 | Suguru et al. | |

\* cited by examiner

SEPARATION AND RECOVERY METHOD

TECHNICAL FIELD

The present disclosure relates to a separation and recovery method.

BACKGROUND

Fibrous carbon nanostructures such as carbon nanotubes (hereinafter also referred to as "CNTs") have excellent mechanical strength, sliding properties, flexibility, semiconducting and metallic conductivity, heat conductivity and other various characteristics, as well as high chemical stability. Thus, they have been extensively used in a wide spectrum of applications.

Against this backdrop, methods for efficiently and inexpensively producing fibrous carbon nanostructures that offer such excellent characteristics have been studied.

For example, PTL 1 discloses a technique for synthesizing carbon nanotubes on a support substrate by providing a stream of a feedstock gas composed of acetylene, carbon dioxide and inert gases at a given partial pressure over the surface of a support substrate on which a catalyst made of Fe and Al is supported. Further, particulate support substrates have been studied (see, e.g., PTL 2).

CITATION LIST

Patent Literature

PTL 1: WO2012057229
PTL 2: WO2017145604

SUMMARY

Technical Problem

As methods of recovering the synthesized carbon nanotubes by separation from the support substrate, there has been demands for simpler separation and recovery methods that allow a particulate support substrate and carbon nanotubes to be separately recovered by separating them from composite particles formed of the particulate support substrate and the carbon nanotubes.

An object of the present disclosure is therefore to provide a simpler separation and recovery method that allows a particulate ceramic support substrate and fibrous carbon nanostructures to be separately recovered from composite particles formed of the particulate ceramic support substrate covered with the fibrous carbon nanostructures.

Solution to Problem

The inventor conducted diligent investigation to achieve the object set forth above. The inventor has established that a particulate ceramic support substrate and fibrous carbon nanostructures can be more easily recovered separately from composite particles formed of the particulate ceramic support substrate covered with the fibrous carbon nanostructures, by utilizing an external force and a fluid flow as a drag against the centrifugal force (e.g., air vortex formed by a centrifugal force and airflow as a drag against the centrifugal force). Thus, the inventor has completed the present disclosure.

Specifically, the present disclosure is aimed at advantageously solving the problem set forth above, and the presently disclosed separation and recovery method is a method for separately recovering a particulate ceramic support substrate and fibrous carbon nanostructures from composite particles formed of the particulate ceramic support substrate covered with the fibrous carbon nanostructures, wherein the method comprises: a separation step wherein the composite particles are transferred to a vicinity of an inlet of a fibrous carbon nanostructure path configured to recover the fibrous carbon nanostructures by allowing the fibrous carbon nanostructures to pass therethrough, and a fluid flowing toward the inlet of the fibrous carbon nanostructure path and an external force including a component of a direction opposite to the direction in which the fluid flows are applied to the composite particles to separate the fibrous carbon nanostructures and the particulate ceramic support substrate; and a recovery step wherein the separated fibrous carbon nanostructures are transferred to an interior of the fibrous carbon nanostructure path for recovery by a flow of the fluid, with the separated particulate ceramic support substrate being transferred away from the fibrous carbon nanostructure path for recovery, wherein, in the separation step, the external force applied to the particulate ceramic support substrate is greater than the external force applied to the fibrous carbon nanostructures. By utilizing an external force and a fluid flow as described above, it is possible to more easily separately recover a particulate ceramic support substrate and fibrous carbon nanostructures from composite particles formed of the particulate ceramic support substrate covered with the fibrous carbon nanostructures.

In the presently disclosed separation and recovery method, it is preferred that the fluid contains air and/or inert gas. When the fluid contains air and/or inert gas, it is possible to prevent the fluid from reacting with the composite particles.

In the presently disclosed separation and recovery method, it is preferred that the external force includes a gravitational force and/or a centrifugal force generated by rotating the composite particles about a predetermined rotating shaft. When the external force includes a gravitational force and/or a centrifugal force generated by rotating the composite particles about a predetermined rotating shaft, it is more ensured that the particulate ceramic support substrate and fibrous carbon nanostructures are separately from the composite particles formed of the particulate ceramic support substrate covered with the fibrous carbon nanostructures.

In the presently disclosed separation and recovery method, it is preferred that the ratio v/p of the linear flow rate v (m/s) of the fluid to the true density p (g/cm$^3$) of the particulate ceramic support substrate is 1 or more. When the ratio v/p is 1 or more, the recovery rate of the fibrous carbon nanostructures can be increased.

The term "true density" as used herein means the "density calculated from the volume of the measurement target itself." The "true density" can be measured by the method described in Examples.

In the presently disclosed separation and recovery method, it is preferred that the ratio of the true density of the particulate ceramic support substrate to the true density of the fibrous carbon nanostructures (true density of the particulate ceramic support substrate/true density of the fibrous carbon nanostructures) is 2 or more. When the ratio of the true density of the particulate ceramic support substrate to the true density of the fibrous carbon nanostructures is 2 or more, the amount of fibrous carbon nanostructures undesirably mixed into the particulate ceramic support substrate recovery unit can be reduced, so that the recovery rate of the fibrous carbon nanostructures can be increased.

In the presently disclosed separation and recovery method, it is preferred that the ratio of the bulk density of the particulate ceramic support substrate to the bulk density of the fibrous carbon nanostructures (bulk density of the particulate ceramic support substrate/bulk density of fibrous carbon nanostructures) is 10 or more. When the ratio of the bulk density of the particulate ceramic support substrate to the bulk density of the fibrous carbon nanostructures is 10 or more, it is possible to prevent the particulate ceramic support substrate from being mixed into the fibrous carbon nanostructure recovery unit.

The term "bulk density" as used herein means the "density calculated based on the internal volume of a given container filled with a measurement target." The internal volume of a container used to calculate the bulk density includes not only the volume of the measurement target itself, but also the volume of the void space among grains of measurement target and within the container. The "bulk density" can be measured by the method described in Examples.

Advantageous Effect

According to the present disclosure, it is possible to provide a simpler separation and recovery method that allows a particulate ceramic support substrate and fibrous carbon nanostructures to be separately recovered from composite particles formed of the particulate ceramic support substrate covered with the fibrous carbon nanostructures.

DETAILED DESCRIPTION

Embodiments will be described below in detail.

The presently disclosed separation and recovery method can be used when separately recovering a particulate ceramic support substrate and fibrous carbon nanostructures by separating the particulate ceramic support substrate and the fibrous carbon nanostructures from composite particles formed of the particulate ceramic support substrate covered with the fibrous carbon nanostructures.

Separation and Recovery Method

The presently disclosed separation and recovery method separately recovers a particulate ceramic support substrate and fibrous carbon nanostructures from composite particles formed of the particulate ceramic support substrate covered with the fibrous carbon nanostructures. The presently disclosed separation and recovery method includes: a separation step wherein composite particles are transferred to the vicinity of an inlet of a fibrous carbon nanostructure path configured to recover fibrous carbon nanostructures by allowing the fibrous carbon nanostructures to pass therethrough, and a fluid flowing toward the inlet of the fibrous carbon nanostructure path and an external force including a component of a direction opposite to the direction in which the fluid flows are applied to the composite particles to separate the fibrous carbon nanostructures and the particulate ceramic support substrate; and a recovery step wherein the separated fibrous carbon nanostructures are transferred to the interior of the fibrous carbon nanostructure path for recovery by the flow of the fluid, with the separated particulate ceramic support substrate being transferred away from the fibrous carbon nanostructure path for recovery. Optionally, the presently disclosed separation and recovery method includes additional step(s).

Complex Particles

The composite particles to be subjected to the presently disclosed separation and recovery method have a particulate ceramic support substrate and fibrous carbon nanostructures covering the surface of the particulate ceramic support substrate.

Figure 1:
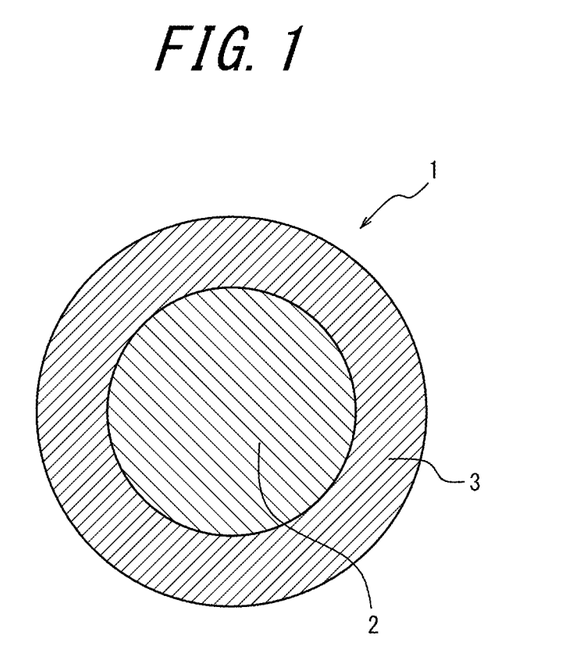
FIG. 1 is a cross-sectional view of a composite particle to be processed in accordance with the presently disclosed separation and recovery method.

In FIG. 1, a composite particle 1 has a particulate ceramic support substrate 2 and a fibrous carbon nanostructure 3 deposited on the surface of the particulate ceramic support substrate 2.

The bulk density of the composite particles is not particularly limited but is preferably 1 g/cm$^3$ or less.

Particulate Ceramic Support Substrate

The particulate ceramic support substrate is made of any ceramic material and has a particulate form, forming a matrix for depositing a fibrous carbon nanostructure described later on the surface of the substrate. When such a particulate ceramic support substrate is used, composite particles produced using the particulate ceramic support substrate correspondingly have a particulate form.

It is only necessary that the particulate ceramic support substrate has a substantially particulate form, preferably with an aspect ratio of 10 or less.

The "aspect ratio of the particulate ceramic support substrate" can be determined by measuring the major and minor axis lengths of 100 randomly selected particulate ceramic support substrates by transmission electron microscopy.

As to the structure of the particulate ceramic support substrate, the particulate ceramic support substrate may be used alone, or a particulate ceramic support substrate with an underlayer may be used wherein an optional underlayer for favorably depositing a fibrous carbon nanostructure on the surface of the particulate ceramic support substrate is provided. The underlayer can be made of any material and one or more underlayers can be formed on the surface of the particulate ceramic support substrate.

The composition of the underlayer is not particularly limited and can be selected as appropriate depending on the type of the particulate ceramic support substrate and the type of the fibrous carbon nanostructure described later. The thickness of the underlayer can also be adjusted as appropriate depending on the desired amount of the deposited fibrous carbon nanostructure.

The particulate ceramic support substrate can be made of any ceramic material, but preferably contains a metal oxide, more preferably contains a metal oxide containing at least one element selected from the group consisting of magnesium (Mg), aluminum (Al), silicon (Si), zirconium (Zr), and molybdenum (Mo), and even more preferably is composed of a metal oxide such as zirconium dioxide (zirconia), aluminum oxide (alumina), or mullite (compound of aluminum oxide and silicon dioxide). When the particulate ceramic support substrate is made of a metal oxide, heat resistance can be improved. Further, when aluminum oxide or mullite is used as the metal oxide, heat resistance can be further improved.

The diameter of the particulate ceramic support substrate is not particularly limited, but is preferably 50 µm or more and 10 mm or less.

The bulk density of the particulate ceramic support substrate is not particularly limited, but is preferably 2 g/cm$^3$ or more and 4 g/cm$^3$ or less.

Fibrous Carbon Nanostructures

The fibrous carbon nanostructures are not particularly limited and examples thereof include those having an aspect ratio of more than 10. Specific examples include CNTs and vapor-grown carbon fibers.

The "aspect ratio of fibrous carbon nanostructures" can be obtained by measuring diameters (outer diameters) and lengths of 100 randomly selected fibrous carbon nanostructures by transmission electron microscopy.

Below is described an embodiment in which fibrous carbon nanostructures obtained by the presently disclosed production method include CNTs. It should be noted that the present disclosure is not limited to this particular embodiment.

The thickness of a layer formed of the fibrous carbon nanostructures in a composite particle is not particularly limited, but is preferably 0.05 mm or more and preferably 1.0 mm or less.

The bulk density of the fibrous carbon nanostructures is not particularly limited, but is preferably 0.01 g/cm$^3$ or more and preferably 0.03 g/cm$^3$ or less.

Carbon Nanotubes

A carbon nanotube (CNT) is a material formed of a graphene sheet wound in cylindrical shape and has a one-dimensional structure with a very large aspect ratio (see PTL 1). Fibrous carbon nanostructures including CNTs may be composed solely of CNTs or may be a mixture of CNTs and fibrous carbon nanostructures other than CNTs.

CNTs are not particularly limited and may be single-walled carbon nanotubes and/or multi-walled carbon nanotubes. From the viewpoint of improving various characteristics such as mechanical strength, electrical characteristics, and thermal conductivity, CNTs are preferably composed of 10 walls or less, more preferably 5 walls or less, and even more preferably are single-walled CNTs. Single-walled carbon nanotubes/multi-walled carbon nanotubes can be appropriately adjusted by changing various reaction conditions such as, for example, the catalyst size, catalyst composition, reaction time, and flow rate of feedstock gas.

Properties

The average diameter of the fibrous carbon nanostructures including CNTs can be any desired value depending on the intended application. In general, the smaller the average diameter of CNTs, the better various characteristics they have.

The "average diameter" of the fibrous carbon nanostructures including CNTs can be obtained for example by measuring the diameters (outer diameters) of 100 randomly selected fibrous carbon nanostructures by transmission electron microscopy.

The average length of the fibrous carbon nanostructures including CNTs can be any desired value depending on the intended application. The average length at the time of synthesis of the fibrous carbon nanostructures including CNTs is preferably 1 µm or more, and more preferably 50 µm or more. When the average length of the fibrous carbon nanostructure including CNTs at the time of synthesis is 1 µm or more, it is possible to more favorably allow the resulting fibrous carbon nanostructures to exert various characteristics such as mechanical strength, electrical characteristics, and heat conductivity. The longer the fibrous carbon nanostructure including CNTs at the time of synthesis, the more likely it is that damage such as fractures and cuts occur. For this reason, the average length of the fibrous carbon nanostructures including CNTs at the time of synthesis is preferably 5,000 µm or less.

The "average length" of the fibrous carbon nanostructures including CNTs can be adjusted as appropriate for example by changing the synthesis reaction time.

In the presently disclosed separation and recovery method, for example, composite particles are processed which are obtained by producing fibrous carbon nanostructures on the surface of a particulate ceramic support substrate and growing the produced fibrous carbon nanostructures by chemical vapor deposition.

The ratio of the true density of the particulate ceramic support substrate to the true density of the fibrous carbon nanostructures (true density of the particulate ceramic support substrate/true density of the fibrous carbon nanostructures) is not particularly limited, but is preferably 2 or more from the viewpoint of improving the recovery rate of the fibrous carbon nanostructures.

The ratio of the bulk density of the particulate ceramic support substrate to the bulk density of the fibrous carbon nanostructures (bulk density of the particulate ceramic support substrate/bulk density of the fibrous carbon nanostructures) is not particularly limited, but is preferably 10 or more from the viewpoint of preventing the particulate ceramic support substrate from mixing into the fibrous carbon nanostructure recovery unit.

Separation Step

In the presently disclosed separation and recovery method, the composite particles are transferred to the vicinity of an inlet of a fibrous carbon nanostructure path configured to recover fibrous carbon nanostructures by allowing the fibrous carbon nanostructures to pass therethrough, and a fluid flowing toward the inlet of the fibrous carbon nanostructure path and an external force including a component of a direction which is opposite to the direction in which the fluid flows are applied to the composite particles, thereby allowing the fibrous carbon nanostructures and the particulate ceramic support substrate to be separated from each other.

The type of the external force is not particularly limited and suitable examples thereof include the gravitational force and a centrifugal force generated by rotating the composite particles about a predetermined rotating shaft.

The type of the fluid is not particularly limited and suitable examples thereof include air and inert gas.

It is only necessary that the external force includes a component of a direction opposite to the direction in which the fluid flows. It is preferred that the direction of the external force is opposite to the direction in which the fluid flows.

Transfer

In the presently disclosed separation and recovery method, the composite particles are first transferred to the vicinity of an inlet of a fibrous carbon nanostructure path.

Transfer methods are not particularly limited as long as the composite particles are transferred to the vicinity of the inlet of the fibrous carbon nanostructure path; the composite particles may be transferred for example by means of air or gravitational force.

Fibrous Carbon Nanostructure Path

The fibrous carbon nanostructure path is not particularly limited as long as it is a space through which fibrous carbon nanostructures can pass. The fibrous carbon nanostructure path can be, for example, a cavity 32, 62 shown in FIG. 2A described later, or a rotating rotor 130 shown in FIG. 3A described later.

The inlet of the fibrous carbon nanostructure path is not particularly limited as long as it is a gap (slit) that communicates with the fibrous carbon nanostructure path. The inlet can be, for example, a gap 38 (slit) in FIG. 2A described later, or a powder introduction port 130a provided in the rotating rotor 130 described later in FIG. 3A.

Separation

In the separation step, the external force applied to the particulate ceramic support substrate is greater than the external force applied to the fibrous carbon nanostructure. This balance separates the composite particles into the particulate ceramic support substrate (to be moved by external force) and fibrous carbon nanostructures (to be moved by fluid flow).

When the external force is a centrifugal force generated by rotating the composite particles about a predetermined rotating shaft, the particulate ceramic support substrate, which has a larger density, receives a more force by the centrifugal force, whereas the fibrous carbon nanostructures, which have a smatter density, receives more drag. This balance separates the composite particles into the particulate ceramic support substrate (to be moved by centrifugal force) and fibrous carbon nanostructures (to be moved by airflow) due to the difference in size (volume) and/or mass between the particulate ceramic support substrate and the fibrous carbon nanostructures.

Fluid Flow

The fluid flow is not particularly limited as tong as it is a flow of a fluid flowing towards the inlet of the fibrous carbon nanostructure path. For example, the fluid flow enters a classification chamber 46 from an annular path 6 in such a manner that, as described in the explanation of FIG. 2A, air that flowed in from an air introduction port 14 by the formation of a negative pressure inside a separation/recovery device 100 is converted by auxiliary vanes 4 into an airflow circulating in the rotational direction (i.e., air becomes an airflow having the substantially the same circumferential speed as a classification rotor 30).

The ratio v/p of the linear flow rate v (m/s) of the fluid to the true density p ($g/cm^3$) of the particulate ceramic support substrate is not particularly limited, but is preferably 1 or more, more preferably 1.3 or more, more preferably 1.5 or more, and particularly preferably 1.7 or more. When the ratio v/p is 1 or more, the recovery rate of fibrous carbon nanostructures can be improved.

Centrifugal Force

A centrifugal force as the external force is generated by the rotation of predetermined rotating means (e.g., a classification rotor 30 (FIG. 2A), a balancing rotor 60 (FIG. 2A), a rotating rotor 130 (FIG. 3A)) and acts in a direction away from the rotating shaft (centrifugal direction).

Recovery Step

In the presently disclosed separation and recovery method, the separated fibrous carbon nanostructures are transferred into the interior of the fibrous carbon nanostructure path by a fluid flow for recovery, with the separated particulate ceramic support substrate being transferred away from the fibrous carbon nanostructure path for recovery. Thus, the presently disclosed separation and recovery method easily allows the particulate ceramic support substrate and fibrous carbon nanostructures to be separately recovered from composite particles.

When the external force is a centrifugal force generated by rotating composite particles about a predetermined rotating shaft, it is preferred that the direction in which the fibrous carbon nanostructures are recovered is the rotation axis direction of the rotating means from the viewpoint of ease of separation and recovery.

Additional Steps

When a small amount of fibrous carbon nanostructures has been mixed with the recovered particulate ceramic support substrate, it is difficult to separate them. However, such fibrous carbon nanostructures can be removed by classification with a predetermined sieve (i.e., by performing a classification step as an additional step).

The following describes a specific procedure for separately recovering a particulate ceramic support substrate and fibrous carbon nanostructures from composite particles using the method described above (forced vortex classification). The present disclosure is not limited to the following specific example and encompasses circulating air flow mode and free vortex mode.

Figure 2A:
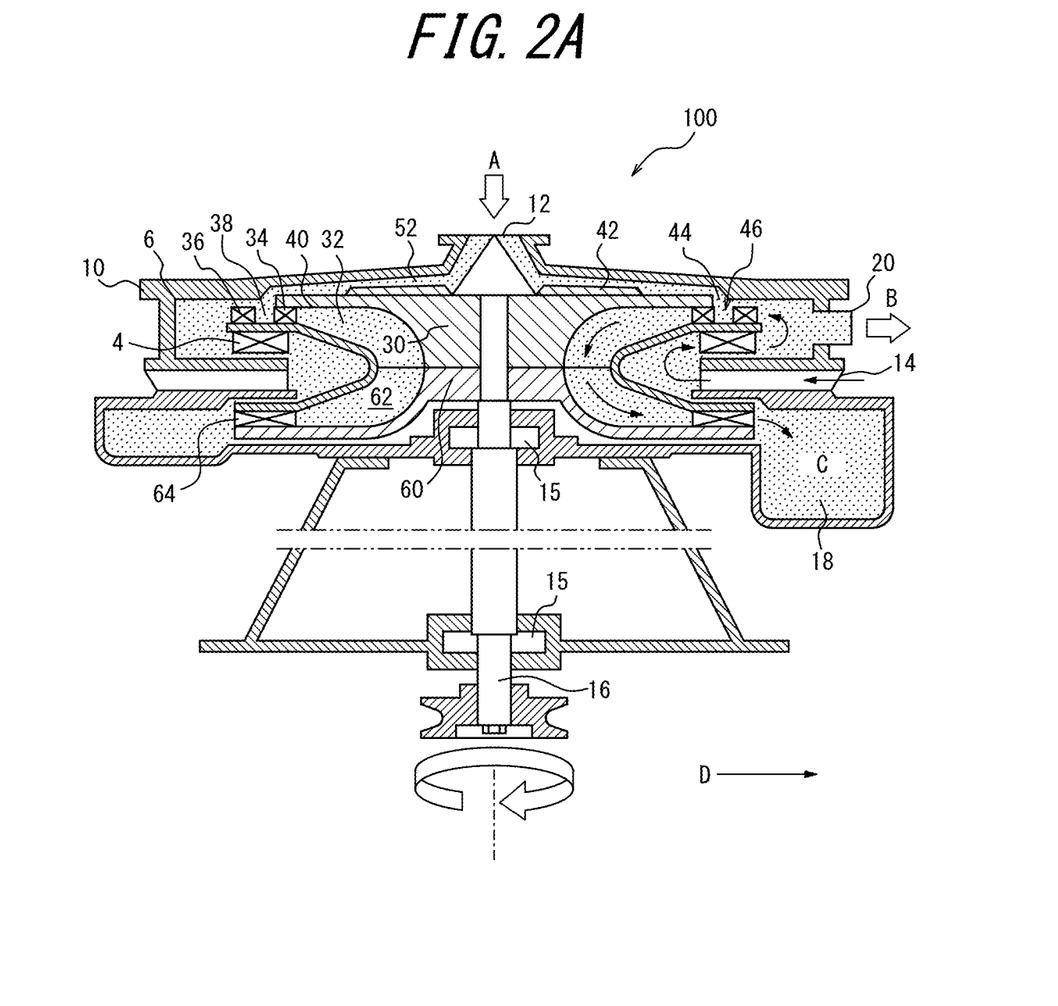
FIG. 2A is a first illustration for explaining an example of the presently disclosed separation and recovery method.

FIG. 2A is a first illustration for explaining an example of a separation and recovery method according to the present disclosure.

In FIG. 2A, the separation and recovery device 100 includes: a casing 10; a classification rotor 30 rotatably provided to a rotating shaft 16 inside the casing 10; and so forth. The casing 10 has a raw material inlet 12 in the center of the top surface, an annular path 6 on the outer periphery, and an air introduction port 14 and a coarse powder outlet (particulate ceramic support substrate recovery unit) 20 on the circumferential side. A path 52 is formed between the casing 10 and a top plate 40 of the classification rotor 30 and communicates with the raw material inlet 12. Also provided at an outward lower part is a vortex casing (fibrous carbon nanostructure recovery unit) 18 to which a collection device such as a cyclone or a back filter (not illustrated) is coupled.

The classification rotor 30 has a disc shape and has a cavity 32 (fibrous carbon nanostructure path) running downwardly from the circumferential portion toward the axial center portion and is affixed to the upper end of the rotating shaft 16 mounted vertically by a bearing 15 to the longitudinal axial center portion of the casing 10. In the cavity 32, outward classification vanes 36 and inward classification vanes 34 are arranged radially at equal intervals along the circumferential direction such that they form two stages of vanes in the radial direction of the rotor.

Between the outward classification vanes 36 and the inward classification vanes 34, there is formed a gap 38 of desired size. On the top plate 40 of the classification rotor 30, powder dispersion vanes 42 are provided radially from the axial center portion along the outer circumferential direction. Also formed is a ring-shaped powder inlet 44 which communicates with the cavity 32 and matches the gap 38. By the outward classification vanes 36, the inward classification vanes 34 and the like, a classification chamber 46 is defined along the outer periphery of the inside of the classification rotor 30.

On the lower surface of the classification rotor 30, auxiliary vanes 4 are provided on the substantially the same circumference as the outward classification vanes 36 and the inward classification vanes 34. The auxiliary vanes 4 are radially provided at equal intervals along the circumferential direction. The auxiliary vanes 4 form an air flow of rotation direction when the classification rotor 30 is rotated, so as to introduce air into the gap 38 (inlet of the fibrous carbon nanostructure path) in a circulating state.

Under the classification rotor 30, there is provided a balancing rotor 60 having substantially the same shape as the classification rotor 30. The balancing rotor 60 has a disc shape and has a cavity 62 (fibrous carbon nanostructure path) running from the circumferential portion toward the axial center portion so as to be vertically symmetrical with the classification rotor 30. Also, the cavity 62 is in communication with the cavity 32 of the classification rotor 30. The balancing rotor 60 is integrally affixed to the rotating shaft 16. Further, a large number of vanes 64 are provided radially at the opened circumferential edge in the cavity 62 of the balancing rotor 60.

Hereinafter, an example of the separation and recovery method will be described in detail.

First, the classification rotor 30 and the balancing rotor 60 are rotated at a desired rate to form a negative pressure within the separating and collecting device 100 with the suction effect of the balancing rotor 60 and a blower (not shown) coupled to the outside. Air flowed from the air introduction port 14 is converted by the auxiliary vanes 4 into an airflow circulating in the rotation direction, i.e., becomes an air flow having substantially the same circumferential speed as the classification rotor 30, and enters the classification chamber 46 from the annular path 6. In the classification chamber 46, air flows radially along the inward classification vanes 34 and the outward classification vanes 36, and the air that passed through the cavity 62 of the balancing rotor 60 through the cavity 32 is sucked into a blower (not illustrated) of the cyclone through the vortex casing 18.

When composite particles as a raw material are introduced from the raw material inlet 12 in this state, the introduced composite particles are moved through the path 52 to the vicinity of the gap 38 (powder introduction port 44, classification chamber 46) by the centrifugal force caused by the rotation of the classification rotor 30 and the balancing rotor 60. The composite particles moved to the vicinity of the gap 38 receives a centrifugal force generated by the rotation of the classification rotor 36 and the balancing rotor 60 and the airflow flowing in the arrow direction as a drag acting in the opposite direction of the centrifugal force to cause separation of the fibrous carbon nanostructures from the particulate ceramic support substrate. The particulate ceramic support substrate having a large specific gravity (true density) is blown in the centrifugation direction away from the rotating shaft 16 by the centrifugal force (to the outside of the separation/recovery device 100) and is recovered as a coarse powder through a coarse powder outlet 20. On the other hand, the fibrous carbon nanostructures having a low specific gravity (true density) pass through the classification vanes 34, 36 along the airflow and is recovered as a fine powder in the vortex casing 18 by passing through the cavity 32, 62.

Figure 2B:
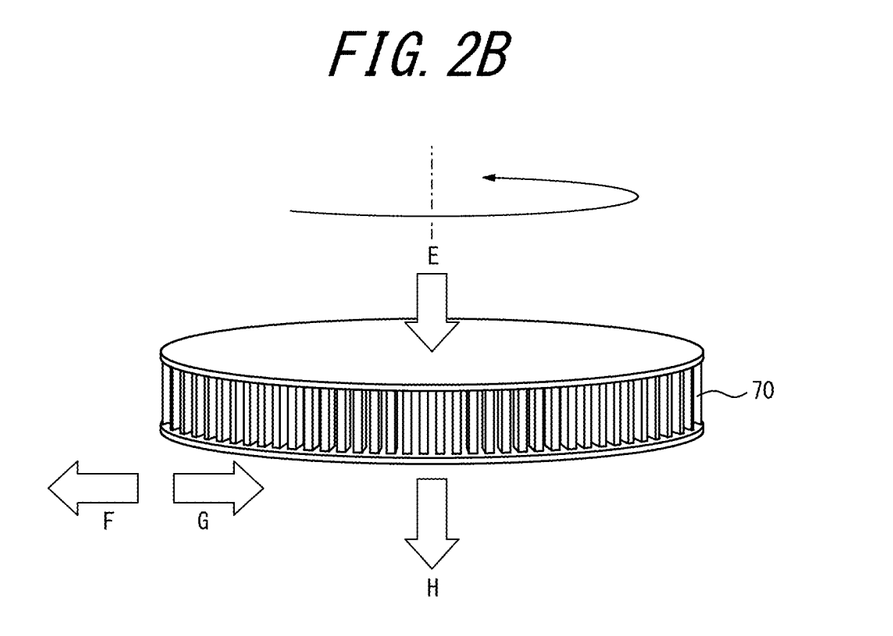
FIG. 2B is an illustration showing an action by an example of a rotating silt.

FIG. 2B shows an operation by an example of a rotating slit.

A rotating slit 70 shown in FIG. 2B is constituted of the top plate 40, inward classification vanes 34, outward classification vanes 36, gap 38, and cavity 32, 62 in FIG. 2A.

First, composite particles charged as a raw material from above the rotating slit 70 moves to the side surface of the rotating slit 70 (corresponding to "vicinity of the gap 38" in FIG. 2A) by a centrifugal force. An air vortex generated by the centrifugal force and drag (airflow) at the side surface of the rotating slit 70 then separates the composite particles into a particulate ceramic support substrate and fibrous carbon nanostructures (i.e., fibrous carbon nanostructures are removed from the particulate ceramic support substrate). The fibrous carbon nanostructures pass through slits formed in the side surface of the rotating slit 70 along the drag (airflow) and are recovered as fine powder by passing through the interior (cavity 32, 62 in FIG. 2A) of the rotating slit 70.

Figure 3A:
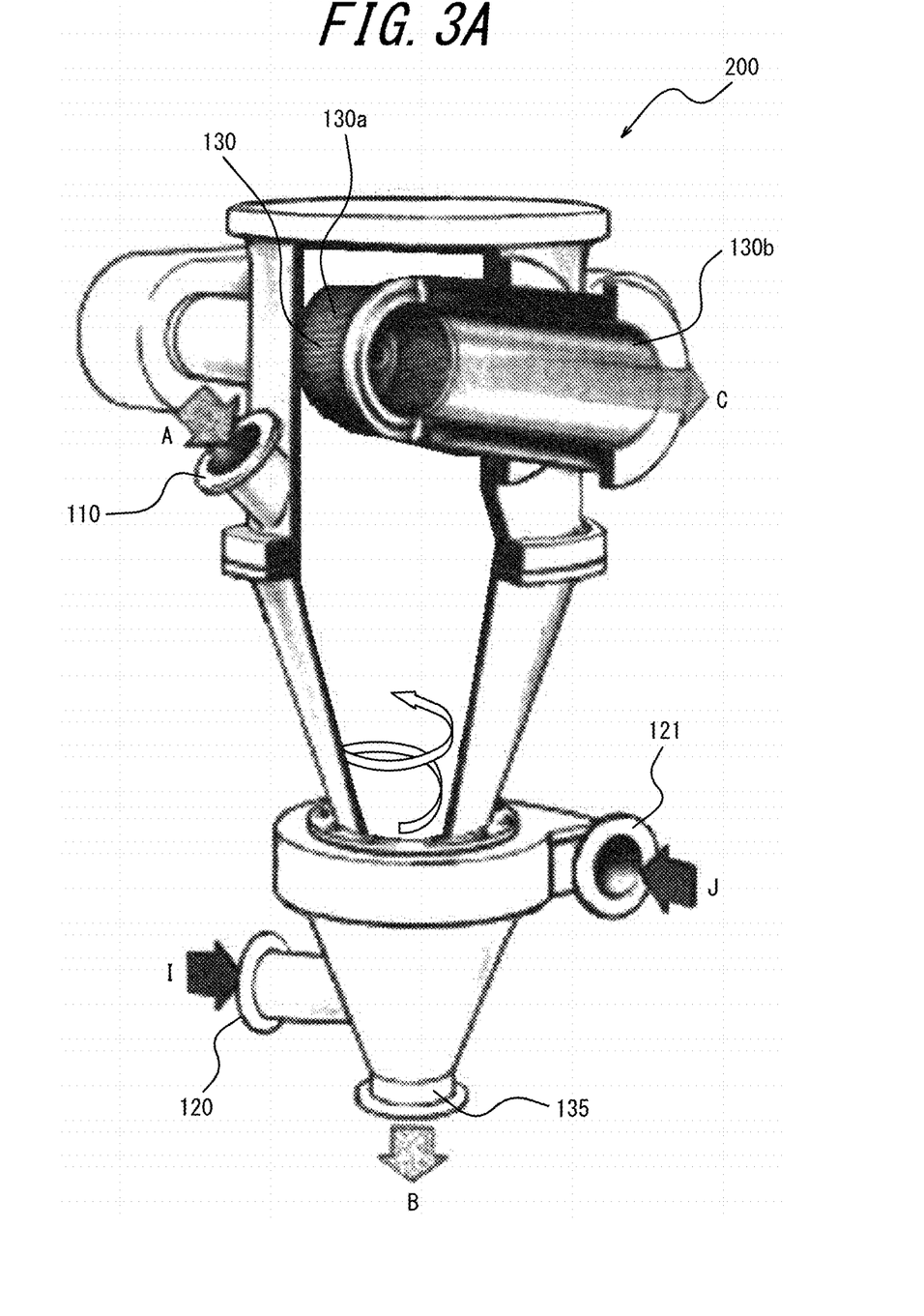
FIG. 3A is a second illustration for explaining an example of the presently disclosed separation and recovery method.

FIG. 3A is a second illustration for explaining an example of the presently disclosed separation and recovery method.

In FIG. 3A, a separation and recovery device 200 includes an raw material inlet 110 provided at the side surface of the device; air introduction ports 120, 121 provided at the lower part of the device; a rotating rotor 130 provided at the upper side in the inside of the device and functioning as a "fibrous carbon nanostructure path" and "rotating means for rotating composite particles about a rotating shaft"; and a coarse powder outlet 135 provided at the lower part of the device. The rotating rotor 130 is provided with a rotating slit body 140 (see FIG. 3B). At the side surface of the rotating slit 140 body, a powder introduction port 130a is formed through which fibrous carbon nanostructures are introduced into the inside of the rotating slit body 140. The rotating rotor 130 is also provided with a rotating rotor side 130b for recovering fibrous carbon nanostructures that have passed through the interior of the rotating slit body 140 constituting the rotating rotor 130.

Hereinafter, an example of the separation and recovery method will be described in detail.

First, when composite particles as a raw material are introduced from a raw material inlet 110, the composite particles fall vertically downward by the gravitational force. During falling, they are blown upward either by primary air from the air introduction port 120 or secondary air from the air introduction port 12 and move to the vicinity of the powder inlet 130a (inlet of the fibrous carbon nanostructure path) provided in the rotating rotor 130. In addition, primary air and secondary air flow into the rotating rotor 130 to form airflow. Fibrous carbon nanostructures are separated from the particulate ceramic support substrate of composite particles by the centrifugal force caused by the rotation of the rotating rotor 130 and the airflow as a drag that acts in the opposite direction of the centrifugal force. The particulate ceramic support substrate having a large specific gravity (true density) is blown by the centrifugal force in the centrifugal direction (downward direction in FIG. 3A) away from the rotating shaft of the rotary rotor 130 and is recovered as a coarse powder through a coarse powder outlet 135. The particulate ceramic support substrate is not blown upward by the primary air or secondary air because of its high specific gravity. On the other hand, fibrous carbon nanostructures having a small specific gravity (true density) pass through the rotating rotor 130 along the airflow, pass through the rotating rotor side 130b, and are recovered as a fine powder.

Figure 3B:
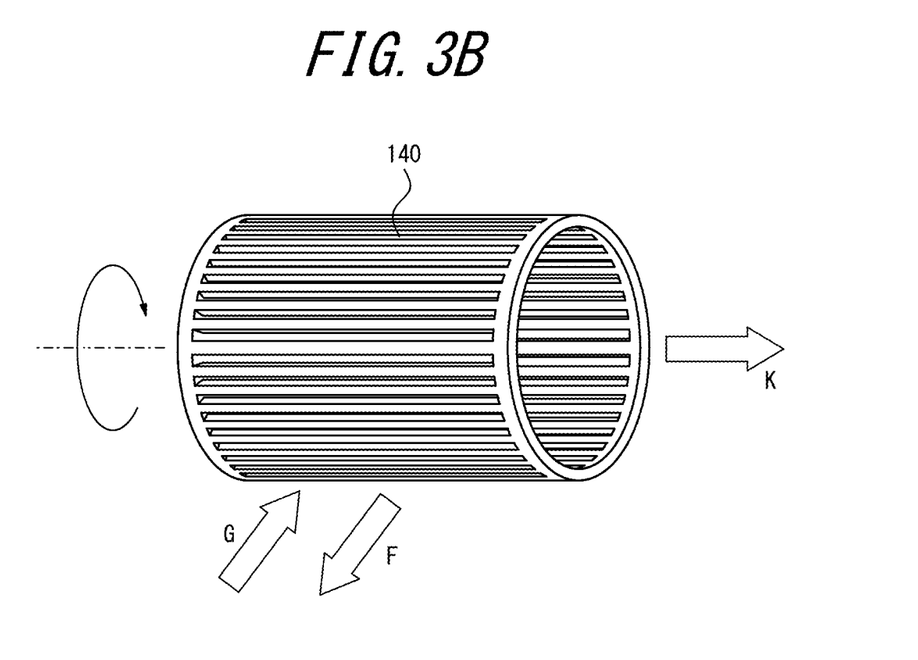
FIG. 3B is an illustration showing a rotating slit body constituting a rotating rotor.

FIG. 3B shows a rotating slit body constituting the rotating rotor.

A rotating slit body 140 in FIG. 3B is a member constituting the rotating rotor 130 shown in FIG. 3A.

First, the transferred composite particles move to the vicinity of the side surface of the rotation slit body 140. Next, in the vicinity of the side surface of the rotation slit body 140, an air vortex is generated by the centrifugal force and drag. The generated air vortex causes the composite particles to be separated into a particulate ceramic support substrate and fibrous carbon nanostructures (i.e., fibrous carbon nanostructures are removed from the particulate ceramic support substrate). The fibrous carbon nanostructures pass through the powder introduction inlet 130a as slits formed in the side surface of the rotating slit body 140 along airflow and are recovered as fine powder by passing through the rotating rotor side 130b (FIG. 3A) which is the side of the rotating slit body 140.

EXAMPLES

Examples of the present disclosure will be described below, which however shall not be construed as limiting the scope of the present disclosure.

Example 1

Preparation of Complex Particles

After a reduction step with hydrogen at high temperatures, a zirconia particle substrate covered with Fe catalyst was exposed to carbon gas and trace amounts (several hundreds of ppm by mass) of moisture at high temperatures.

In this manner, composite particles 1 (true density: 5.9 g/cm$^3$, bulk density: 0.51 g/cm$^3$) were obtained in which a particulate ceramic support substrate made of zirconia (zirconium dioxide) (true density: 6.0 g/cm$^3$, bulk density: 3.9 g/cm$^3$) having a diameter of 0.3 mm is covered with a 0.23 mm-thick CNT layer made of CNTs (true density: 1.3 g/cm$^3$, bulk density: 0.2 g/cm$^3$) as fibrous carbon nanostructures.

The true density and bulk density of the particulate ceramic support substrate, fibrous carbon nanostructures and composite particles were measured as described below.

Measurement of True Density

Measurements were made using a dry automated densitometer (AccuPyc, Shimadzu Corporation).

Measurement of Bulk Density

Measurements were made using a particle reduction rate meter (compacted bulk density meter) (model TPM-3P, Tsutsui Scientific Instruments, Co., Ltd.). Approximately 60 mL was placed in a measuring vessel and the weight was measured. The capacity after a total of 200 taps was measured to determine the bulk density.

Separation and Recovery

Separation and recovery were performed using the separation and recovery device shown in FIG. 2A. The rotational speed of the classification rotor 30 and the balancing rotor 60 for rotating composite particles 1 along the rotating shaft was 3,000 rpm, and the width of the gap 38 was 10 mm.

The linear flow rate v of airflow was 12.36 m/s, the ratio v/p of the linear flow rate v (m/s) of airflow to the true density p (g/cm$^3$) of the particulate ceramic support substrate was 2.06, and the recovery rate of CNTs was 95.9% by mass.

The linear flow rate v (m/s) of the airflow was measured as described below, and the recovery rate (% by mass) of CNTs was measured and calculated as described below.

Measurement of Linear Flow Rate v of Airflow

The linear flow rate was calculated by the equation A/B, where A is the quantity A (m$^3$/s) of air passing through the cavity 62 or the rotating rotors (classification rotor 30 and balancing rotor 60), and B is the opening area B (m$^2$) of the rotating rotors.

Measurement and Calculation of Recovery Rate of CNTs

The recovery rate of CNTs was calculated by the equation B/A×100(%), where A is the amount of CNTs increased after synthesis of composite particles, and B is the amount of CNTs recovered on the fine powder side.

Example 2

"Preparation of Composite Particles" and "Separation and Recovery" were performed as in Example 1 except that the linear flow rate v of airflow in the separation and recovery of Example 1 was set to 10.62 m/s instead of 12.36 m/s.

The ratio v/p of the linear flow rate v (m/s) of airflow to the true density p (g/cm$^3$) of the particulate ceramic support substrate was 1.77 and the recovery rate of CNTs was 89.1% by mass.

Example 3

"Preparation of Composite Particles" and "Separation and Recovery" were performed as in Example 1 except that the linear flow rate v of airflow in the separation and recovery of Example 1 was set to 8.82 m/s instead of 12.36 m/s.

The ratio v/p of the linear flow rate v (m/s) of airflow to the true density p (g/cm$^3$) of the particulate ceramic support substrate was 1.47 and the recovery rate of CNTs was 88.2% by mass.

Example 4

"Preparation of Composite Particles" was performed as in Example 1 except that "Separation and Recovery" was performed as described below instead of separation and recovery using the separation and recovery device shown in FIG. 2A.

Separation and Recovery

Separation and recovery were performed using a separation and recovery device shown in FIG. 3A. The rotational speed of the rotating rotor 130 for rotating composite particles 1 along the rotating shaft was 18,000 rpm, the width (circumferential width) of each slit as the powder introduction port 130a provided in the side surface of the rotating rotor 130 was 20 mm, the porosity of the side surface of the rotating rotor 130 formed by the powder introducing port 130a was 75%, and the diameter of the bottom surface of the rotating rotor 130 in cylindrical shape was 50 mm.

The linear flow rate v of airflow was 11.70 m/s, the ratio v/p of the linear flow rate v (m/s) of airflow to the true density p (g/cm$^3$) of the particulate ceramic support substrate was 1.95, and the recovery rate of CNTs was 97.5% by mass.

The linear flow rate v (m/s) of the airflow was measured as described below, and the recovery rate (% by mass) of CNTs was measured and calculated as described below.

The ratio v/p of the linear flow rate v (m/s) of airflow to the true density p (g/cm$^3$) of the particulate ceramic support substrate was 1.95, and the recovery rate of CNTs was 97.5% by mass.

Example 5

"Preparation of Composite Particles" and "Separation and Recovery" were performed as in Example 4 except that the linear flow rate v of airflow in the separation and recovery of Example 4 was set to 10.62 m/s instead of 11.70 m/s.

The ratio v/p of the linear flow rate v (m/s) of airflow to the true density p (g/cm$^3$) of the particulate ceramic support substrate was 1.77 and the recovery rate of CNTs was 99.4% by mass.

Example 6

"Preparation of Composite Particles" and "Separation and Recovery" were performed as in Example 4 except that the linear flow rate v of airflow in the separation and recovery of Example 4 was set to 7.68 m/s instead of 11.70 m/s.

The ratio v/p of the linear flow rate v (m/s) of airflow to the true density p (g/cm$^3$) of the particulate ceramic support substrate was 1.28 and the recovery rate of CNTs was 62.3% by mass.

Example 7

"Preparation of Composite Particles" and "Separation and Recovery" were performed as in Example 4 except that the linear flow rate v of airflow in the separation and recovery of Example 4 was set to 5.28 m/s instead of 11.70 m/s.

The ratio v/p of the linear flow rate v (m/s) of airflow to the true density p (g/cm$^3$) of the particulate ceramic support substrate was 0.88 and the recovery rate of CNTs was 22.0% by mass.

Example 8

Preparation of Complex Particles

After a reduction step with hydrogen at high temperatures, an alumina particle substrate covered with Fe catalyst was exposed to carbon gas and trace amounts (several hundreds of ppm by mass) of moisture at high temperatures. In this manner, composite particles 2 (true density: 3.8 g/cm$^3$, bulk density: 0.47 g/cm$^3$) were obtained in which a particulate ceramic support substrate made of alumina (aluminum oxide) (true density: 3.9 g/cm$^3$, bulk density: 2.4 g/cm$^3$) having a diameter of 0.3 mm is covered with a 0.2 mm-thick CNT layer made of CNTs (true density: 1.3 g/cm$^3$, bulk density: 0.018 g/cm$^3$) as fibrous carbon nanostructures.

Separation and Recovery

Separation and recovery were performed using the separation and recovery device shown in FIG. 3A. The rotational speed of the rotating rotor 130 for rotating composite particles 2 along the rotating shaft was 18,000 rpm, the width (circumferential width) of each slit as the powder introduction port 130a provided in the side surface of the rotating rotor 130 was 20 mm, the porosity of the side surface of the rotating rotor 130 as formed by the powder introducing port 130a was 75%, and the diameter of the bottom surface of the rotating rotor 130 in cylindrical shape was 50 mm.

The linear flow rate v of airflow was 7.68 m/s, the ratio v/p of the linear flow rate v (m/s) of airflow to the true density p (g/cm$^3$) of the particulate ceramic support substrate was 1.97, and the recovery rate of CNTs was 87.3% by mass.

The linear flow rate v (m/s) of airflow was measured as in Example 1, and the recovery rate (% by mass) of CNTs was measured and calculated as in Example 1.

Example 9

"Preparation of Composite Particles" and "Separation and Recovery" were performed as in Example 8 except that the linear flow rate v of airflow in the separation and recovery of Example 8 was set to 5.30 m/s instead of 7.68 m/s.

The ratio v/p of the linear flow rate v (m/s) of airflow to the true density p (g/cm$^3$) of the particulate ceramic support substrate was 1.36, and the recovery rate of CNTs was 43.8% by mass.

In Examples 1 to 9, the composite particles are transported to the vicinity of the inlet (gap 38 (FIG. 2A), powder introduction port 130a (FIG. 3A)) of the fibrous carbon nanostructure path (cavity 32, 62 (FIG. 2A), rotating rotor 130 (FIG. 3A)) for passing and collecting CNTs, and a fluid flow (airflow) toward the inlet of the fibrous carbon nanostructure path and an external force including a component of a direction opposite to the direction of the fluid flow (centrifugal force generated by rotating the composite particles about the rotating shaft (rotating shaft 16 (FIG. 2A)) are applied to composite particles to separate the fibrous carbon nanostructures and the ceramic support from each other (CNTs are separated from the surface of the particulate ceramic support substrate), and the separated CNTs are transported to the interior of the fibrous carbon nanostructure (cavity 32, 62 (FIG. 2A), rotating rotor 130 (FIG. 3A)) for recovery by the fluid flow (airflow) and also the separated particulate ceramic support substrate is transported for recovery in a direction away from the fibrous carbon nanostructure path (direction away from the rotating shaft (rotating shaft 16 (FIG. 2A)) by the centrifugal force (centrifugal direction)). It was thus possible to easily recover a particulate ceramic support substrate and CNTs separately from composite particles formed of the particulate ceramic support substrate covered with the CNTs.

INDUSTRIAL APPLICABILITY

According to the present disclosure, it is possible to provide a simpler separation and recovery method that allows a particulate ceramic support substrate and fibrous carbon nanostructures to be separately recovered from composite particles formed of the particulate ceramic support substrate covered with the fibrous carbon nanostructures.

REFERENCE SIGNS LIST

1 Composite particle
2 Particulate ceramic support substrate
3 Fibrous carbon nanostructure
4 Auxiliary vane
6 Annular path
10 Casing
12 Raw material inlet
14 Air introduction port
15 Bearing
16 Rotating shaft
18 Swirl casing (fibrous carbon nanostructure recovery unit)
20 Coarse powder outlet (particulate ceramic support substrate recovery unit)
30 Classification rotor
32 Cavity
34 inward classification vane
36 Outward classification vane
38 Gap
40 Top plate
42 Powder dispersion vane
44 Powder introduction port
46 Classification chamber
52 Path
60 Balancing rotor
62 Cavity
64 Vane
70 Rotating slit body
100 Separation and recovery device
110 Raw material inlet
120 Air introduction port
121 Air introduction port
130 Rotating rotor
130a Powder introduction port
130b Rotating rotor side
135 Coarse powder outlet
140 Rotating slit body
200 Separation and recovery device
A Raw material
B Coarse powder
C Fine powder
D Airflow
E Raw material charging
F Centrifugal force
G Drag
H Powder and air pass through the bottom for recovery
I Primary air
J Secondary air
K Fine powder and air transversely pass for recovery

The invention claimed is:

1. A separation and recovery method for separately recovering a particulate ceramic support substrate and fibrous carbon nanostructures from composite particles formed of the particulate ceramic support substrate covered with the fibrous carbon nanostructures, the method comprising:
a separation step wherein the composite particles are transferred to a vicinity of an inlet of a fibrous carbon nanostructure path configured to recover the fibrous carbon nanostructures by allowing the fibrous carbon nanostructures to pass therethrough, and a fluid flowing toward the inlet of the fibrous carbon nanostructure path and an external force including a component of a direction opposite to the direction in which the fluid flows are applied to the composite particles to separate the fibrous carbon nanostructures and the particulate ceramic support substrate; and
a recovery step wherein the separated fibrous carbon nanostructures are transferred to an interior of the fibrous carbon nanostructure path for recovery by a flow of the fluid, with the separated particulate ceramic support substrate being transferred away from the fibrous carbon nanostructure path for recovery,
wherein, in the separation step, the external force applied to the particulate ceramic support substrate is greater than the external force applied to the fibrous carbon nanostructures.

2. The separation and recovery method according to claim 1, wherein the fluid contains air and/or inert gas.

3. The separation and recovery method according to claim 1, wherein the external force includes a gravitational force and/or a centrifugal force generated by rotating the composite particles about a predetermined rotating shaft.

4. The separation and recovery method according to claim 1, wherein a ratio v/p of a linear flow rate v (m/s) of the fluid to a true density p ($g/cm^3$) of the particulate ceramic support substrate is 1 or more.

5. The separation and recovery method according to claim 1, wherein a ratio of a true density of the particulate ceramic support substrate to a true density of the fibrous carbon nanostructures (true density of the particulate ceramic support substrate/true density of the fibrous carbon nanostructures) is 2 or more.

6. The separation and recovery method according to claim 1, wherein a ratio of a bulk density of the particulate ceramic support substrate to a bulk density of the fibrous carbon nanostructures (bulk density of the particulate ceramic support substrate/bulk density of fibrous carbon nanostructures) is 10 or more.

* * * * *